(12) United States Patent
Barnichon et al.

(10) Patent No.: US 10,675,928 B2
(45) Date of Patent: Jun. 9, 2020

(54) METHOD OF MEASURING THE INFLATION PRESSURE OR TIRES ON A VEHICLE MOVING ALONG A TRAFFIC ROUTE

(71) Applicant: PI SYSTEM AUTOMATION, Romagnat (FR)

(72) Inventors: Pascal Barnichon, Bellerive sur Allier (FR); Benoit Brandely, Saint Andre le Coq (FR); Gilles Ramillien, Menetrol (FR)

(73) Assignee: PI SYSTEM AUTOMATION, Romagnat (FR)

( * ) Notice: Subject to any disclaimer, the term of this patent is extended or adjusted under 35 U.S.C. 154(b) by 495 days.

(21) Appl. No.: 15/632,972

(22) Filed: Jun. 26, 2017

(65) Prior Publication Data
US 2018/0015794 A1 Jan. 18, 2018

(30) Foreign Application Priority Data
Jul. 18, 2016 (FR) ..................................... 16 56812

(51) Int. Cl.
*B60C 25/00* (2006.01)
*G01L 17/00* (2006.01)
*B60C 25/05* (2006.01)

(52) U.S. Cl.
CPC ........ *B60C 25/002* (2013.01); *B60C 25/0551* (2013.01); *G01L 17/005* (2013.01)

(58) Field of Classification Search
CPC ....................................................... B60C 25/00
See application file for complete search history.

(56) References Cited

U.S. PATENT DOCUMENTS

2013/0186194 A1* 7/2013 Schaefer ................ G01B 11/22
73/146.2

FOREIGN PATENT DOCUMENTS

DE      102010026730 A1    1/2012

\* cited by examiner

*Primary Examiner* — Manuel A Rivera Vargas (57) ABSTRACT

The method for assembling a set of construction elements (1) comprises at least the following steps:
  a) assembling two complementary external faces of two construction elements (1) by adhesion,
  b) continuing the assembly carried out in step a) by adhering other faces of the elements (1) to complementary external faces of other construction elements (1) until a predefined portion of a building or engineered structure is obtained,
  c) adhering sheets (15, 16), so-called cladding sheets, made of a wood-based material to at least a portion of the coplanar faces of the elements (1) assembled in the preceding steps,
  d) repeating steps a) to c) until the part is obtained. The invention also relates to a building made with at least three elements assembled according to the method of the invention.

6 Claims, 2 Drawing Sheets

METHOD OF MEASURING THE INFLATION PRESSURE OR TIRES ON A VEHICLE MOVING ALONG A TRAFFIC ROUTE

The present invention concerns a method of measuring the inflation pressure of tires on a vehicle moving along a traffic route.

Here, the term "vehicle" should be taken in its broadest accepted meaning. It designates any type of vehicle intended for the transport of passengers and/or freight, with manual or automatic guidance, automotive or otherwise, moving along a route, either outdoors or in a confined space. By route is meant here the surface of the rolling zone of the tires. It involves the zone on which the vehicle is moving: a highway, a railway, or any other surface, private or public, adapted to allow the movement of a vehicle.

The types of vehicles involved in the invention utilize tires, whether load-bearing and/or guide tires, possibly associated with other means, as the elements of connection to the rolling zone.

In the following, the invention will be described with reference to a railway vehicle, particularly a tire-mounted subway. Likewise, for easier reading, the terms tires or rubber tires shall be used without distinction. The terms "traffic route" and "rolling track" shall be used without distinction to designate the surface of the rolling zone on which the vehicle travels during the entirety of its trip.

It will be understood that the invention applies to every type of vehicle outfitted with tires, during their movement over a rolling zone. By way of non-limiting example, the type of vehicles that may be cited include: a tramway on tires, a mine trolley, a cable railway, touring cars, trucks, buses, construction machinery, farming, forestry or other machinery.

The use of tires as elements of connection with the rolling zone implies, unlike other types of connection elements such as steel wheels, a regular checking of the inflation pressure of the tires, in order to guarantee optimal safety. A checking of the pressure of the tires when the vehicle is halted is only feasible if the length of the stop of the vehicle is sufficient to allow for such a check. Such a check, depending on the number of tires being checked on the vehicle, takes between several minutes and more than one hour if one is inspecting all the tires on a tire-mounted subway comprising several cars. In other words, a checking of the pressure during the stop of the vehicle is only reasonably feasible prior to the start of service of the vehicle or at the end of its service. In other words, a checking of the pressure during a stop is thus at least cumbersome to carry out and cannot be done at a high frequency.

Such an operation of checking the pressure of the tires, for obvious reasons of safety, needs to be carried out as regularly as possible, without disturbing, as much as possible, the movement of the vehicle. To do so, it is known to measure the inflation pressure of the tires while the vehicle is moving, in the present case a tire-mounted subway car, and without affecting its speed of movement.

This measurement is based on the relations existing between the inflation pressure of a tire and the force which the tire exerts on a sensor located on the rolling surface of the tire. It will be understood that these relations are only verified if the tire is in predefined conditions of use, in particular as regards the vertical load, induced by the weight of the vehicle and borne by the tire. It is then possible, by analyzing the forces exerted by the surface of the tire in contact with the sensor, to define whether the pressure measured indicates that the tire is under-inflated or over-inflated, and thus to take the necessary compensating steps regarding the inflation of that tire.

In order to perform these measurements, sensors of pressure, which are known in themselves and in sufficient number, are positioned on the traffic routes of the vehicle so as to measure the pressures exerted by the tires of the vehicle, whether they are load-bearing tires or non-load-bearing so-called guide tires.

Based on measurements taken with tires whose inflation pressure is known, in an advantageous but not obligatory manner, the relation between the inflation pressure of the tire and the pressure which it exerts on the rolling surface is established, in order to obtain optimal reliability and representativeness of the measurements.

There is known from DE-A-10210026730 a device for measuring the pressure of the tires of a vehicle in movement. Optical means determine the width of the tire when it passes over a surface outfitted with force sensors. These sensors make it possible to determine the dimensions of the zone of contact of the tire and the time of contact with the rolling zone. By comparing obtained values with those in a database, and after application of a possible correction taking into account the measurement temperature, a value of the inflation pressure is deduced. Such a device requires two different types of sensors.

Now, it results that the measurements of the pressure exerted by the tire on a sensor may be falsified under certain conditions of use. In particular, the measurement is no longer trustworthy if there is a vertical movement of oscillation of the tire as it passes over the sensor. Such a movement occurs, for example, when the suspensions of the vehicle are degraded and/or when the rolling surface is not planar. There have also been found measurement differences depending on the axle of the vehicle on which the tire is mounted.

It is these drawbacks which the invention proposes more particularly to remedy by proposing a method of measuring the inflation pressure of a vehicle in movement, regardless of the state of the suspensions of the vehicle, within functional limits, of the rolling surface, and this without modification of the speed of measurement of the sensor or sensors.

For this, the subject of the invention is a method of measuring the inflation pressure of the tires outfitting a vehicle in movement, comprising at least the following steps, during which:
  a) one measures the pressure exerted on at least one sensor of pressure secured to the ground, in the rolling zone of the tire, by a tire rolling over said sensor,
  b) one measures the time during which the tire rolls over said sensor, the latter representing a known surface of contact,
  c) one establishes, during the movement of the tire over said sensor, a curve representing the distribution of the forces exerted by the tire on said surface of contact as a function of the time,
  d) one determines the inflation pressure of the tire with the aid of a computer, with a programming chosen from among an algorithmic programming or a fuzzy logic, integrating at least one model established from measurements taken during steps a) to c) on tires whose inflation pressure is known,
characterized in that the method comprises at least the following step:
  e) during step d), the model used takes into account two other parameters, namely, the length of the tire tread in contact with said sensor, determined during the measurement performed in step b), the speed of the tire being known, and the shape of the curve obtained in step c).

According to advantageous but non obligatory aspects of the invention, such a method may comprise one or more of the following steps:

during a supplemental step f), prior to step d), the length (Lpneu) of the tread of the tire in contact with said sensor during the measurement performed in step a) is established according to a relation (Lvide=Lpneu−K·FC) taking into account the load applied to said tire, Lvide being the length of contact of the tire with the ground when it is subjected to a so-called empty load, K being a coefficient corresponding to the difference between the lengths of the tread under maximum load (Lmax) and empty load (Lvide) and FC being a load factor varying from 0 to 1 depending on whether the vehicle is at empty or at maximum load.

During a supplemental step g) prior to step d), the shape (Forme) of the curve is quantified by a relation taking into account the pressure exerted midway (Psolt) through the movement of the tire over the sensor and the mean pressure (Psolm) exerted by the tire during its movement over the sensor.

Steps a) to c) are performed with several pressure sensors and each of the values obtained per sensor is used for steps d) and e).

The invention will be better understood and more of its advantages will appear more clearly upon perusal of the following description of one embodiment of the invention, given as a non-limiting example and made in reference to the following drawing, in which.

Figure 1:
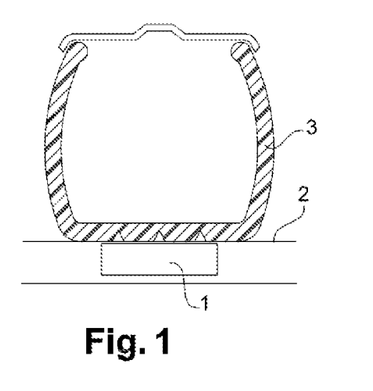
FIG. 1 is a diagram illustrating the position of at least one pressure sensor with respect to a tire for the implementing of a method according to one embodiment of the invention.

FIG. 1 illustrates schematically a pressure sensor 1 used to implement the method. This pressure sensor 1 is secured in a portion 2 of a movement track 4 on which a tire 3 travels. It will be understood that the number and the disposition of the pressure sensor or sensors are adapted to the movement track and to the tire(s) for which one wishes to measure the force which it (they) exert(s) on the movement track. Certain pressure sensors are secured to the ground and are adapted to receive a load-bearing tire. Other pressure sensors are secured perpendicularly to the former and are adapted to measure the pressure of so-called guide tires. The guide tires ensure a lateral guidance of certain types of vehicles, particularly railway vehicles such as tire-mounted subway cars. Such guide tires are not load-bearing in the sense that the load of the vehicle is not applied to these tires, at least not in a significant manner. It should be noted that the invention is implemented with pressure sensors which are known in themselves. Thus, these are sensors measuring a force related to a unit of surface. In the following, the entirety of the values and characteristics measured and taken into account in the invention are only values relative to a pressure, with reference to measurements taken by pressure sensors as previously defined.

Figure 2A:
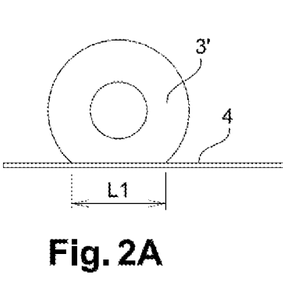
FIGS. 2A to 2C illustrate schematically, in side view, the length of the tread of a tire in contact with a pressure sensor according to three states of inflation of the tire.
Figure 2B:
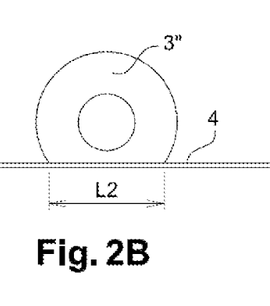
Figure 2C:
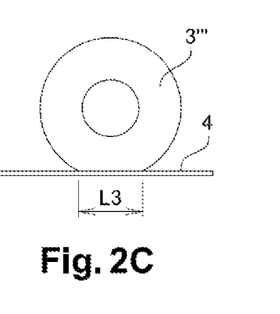

FIGS. 2A to 2C illustrate the relation between the inflation pressure of a tire and the length of the tread of the tire which is in contact with the movement track, i.e., de facto with the pressure sensor when the latter is present on the movement track. FIG. 2A illustrates a tire 3' whose inflation pressure is nominal, that is, a tire inflated to the pressure recommended by the manufacturer for a particular use.

We denote as L1 the length of the tread which is bearing against the movement track 4, it being understood that a pressure sensor, not illustrated, is advantageously secured in the track 4. As emerges from FIG. 2B, when a tire 3", which might be the same tire as that 3' of FIG. 2A, is inflated to a pressure less than the recommended nominal pressure, one notes a flattening of the tire on the movement track, and thus a length L2 of the tread of the tire which is in contact with the track 4 greater than the length L1.

On the other hand, as represented in FIG. 2C, when the tire 3''' is over-inflated, i.e., inflated to a pressure greater than the nominal inflation pressure, the length L3 of the tread in contact with the movement track is reduced as compared to the length L1. In other words, the more the inflation pressure of a tire is elevated, the more the surface of its tread in contact with the ground is reduced.

Figure 3A:
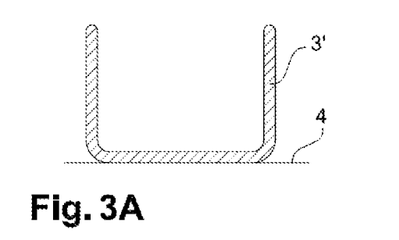
FIGS. 3A to 3C illustrate schematically the configuration of the tread of a tire, front view, according to three states of inflation of the tire.
Figure 3B:
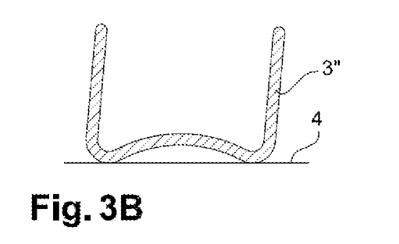
Figure 3C:
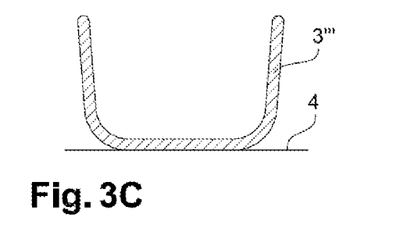

These configurations are shown in FIGS. 3A to 3C. In FIG. 3A, the tread of the tire 3' has an optimal surface of contact with the movement track 4, depending on the width of the tire. In other words, the tire 3' is in contact for its full width with the track 4. On the other hand, in FIG. 3B, the tire 3" being under-inflated, one finds a sagging of the tread of the tire 3" on the track 4. This induces a curvature of the tire depending on its width. This curvature is oriented toward the inside of the tire. Consequently, it presents a hollow zone, not being in contact with the track 4. On the other hand, as appears in FIG. 3C, an over-inflated tire 3''' presents an opposite curvature, i.e., one oriented toward the outside of the tire. Hence, the width of the tread in contact with the track 4 is reduced.

Thus, one notes that the inflation pressure has a physical, visual effect on the dimensional characteristics of the tread of a tire, both as regards the length of the tread of the tire and the width of said tread of the tire.

The measurement of the inflation pressure of the tires, denoted hereafter as Ppneu, is based, in known manner, on the relation existing between the inflation pressure of a tire and the forces exerted on the ground by the portion of the tread of this same tire in contact with the ground, as it rolls over the ground. This force, related to a unit of surface, is de facto a pressure exerted on the ground. It shall be denoted hereafter as Psol.

One of the benefits of this measurement principle is that it does not require any modification or intervention in regard to the tires and/or the vehicles, whatever the type of tires and/or vehicles, the measurement being done during movements of the vehicle on the movement tracks. Of course, this implies that the movement tracks will be outfitted with pressure sensors. Moreover, another advantage of the invention is that it enables a measurement at the nominal speed of movement of the vehicle, without it being necessary to slow down or speed up the vehicle, or thus to modify the traffic flow in order to perform the measurement. It should also be noted that the invention does not require modifications to the pressure sensors, or their number, when these are already present on the movement track. The pressure sensors used are of reduced dimensions as compared to the surface of contact of the tire, which facilitates their putting in place on a movement track.

This relation between the two pressures Ppneu and Psol is verified when the tire is used in conditions which obey the usage constraints prescribed by the tire manufacturer. Among others, the load applied to the tire, and thus de facto the loading of the vehicle, should remain within the specified limits of use of the tire. The same holds for the inflation pressure of the tire Ppneu and for the temperature of the tire, which should remain within the limits of the usage specifications of the tire.

By applying such a relation, one may determine the inflation pressure Ppneu, regardless of the load placed on the tire, i.e., regardless of the number of passengers and/or the quantity of goods in the vehicle whose tire pressures are to be measured. The different instances liable to be encountered are listed below:

I) the inflation pressure Ppneu and the load on the tire are nominal.

In the various examples, the term nominal should be understood as referring to a value, such as the pressure, hereafter denoted as PpneuN, which falls within the range of the pressures commonly encountered and recommended by the manufacturer.

In this first configuration, the surface of contact between the ground and the tread of the tire is likewise nominal. Thus, the pressure exerted on the ground Psol is nominal, corresponding therefore to a tire with a nominal inflation pressure PpneuN.

II) The inflation pressure Ppneu is less than the nominal inflation pressure PpneuN and the load imposed is nominal.

If the tire is deflated and the load placed on the tire is nominal, as illustrated in FIGS. 2B, 3B, the surface of contact between the tread of the tire and the ground is larger. Thus, the pressure exerted on the ground Psol, i.e., the force exerted on the ground per unit of surface, for a nominal load is less than the pressure exerted on the ground with a tire inflated to the nominal pressure PpneuN, which therefore corresponds to a deflated tire, and thus Ppneu<PpneuN.

III) The inflation pressure of the tire is greater than the nominal inflation pressure PpneuN and the nominal load imposed.

If the tire is over-inflated and the load of the tire is nominal, as represented in FIGS. 2C and 3C, the surface of contact between the tread of the tire and the ground is less. Thus, the pressure exerted on the ground Psol, i.e., the force exerted on the ground per unit of surface, for a nominal load, is greater, which therefore corresponds to an over-inflated tire, and thus to Ppneu>PpneuN.

IV) The inflation pressure of the tire is nominal and the load imposed is less than the nominal load.

If the inflation pressure of the tire PpneuN is nominal and the tire is underloaded, this underloading has two effects which cancel each other out:
The pressure exerted on the ground Psol by the tire is less than the pressure exerted on the ground with a nominal load, but the surface of contact between the tread of the tire and the ground is less, and so the pressure exerted on the ground is greater.

Thus, with the mutual cancellation of these two effects, the pressure exerted on the ground is nominal, which therefore corresponds to a nominal inflation pressure of the tire PpneuN.

V) The inflation pressure of the tire is nominal and the load imposed is greater than the nominal load.

If the inflation pressure of the tire is nominal and the tire is overloaded, this overloading has two effects which cancel each other out:

The pressure exerted on the ground is greater than the pressure exerted on the ground with a nominal load, but the surface of contact between the tread of the tire and the ground is greater than when the load is nominal. Thus, the pressure exerted on the ground by the tread of the tire is less. Thus, with the cancellation of these two effects, the pressure exerted on the ground is nominal, which therefore corresponds to a tire with a nominal inflation pressure PpneuN.

One easily understands that, in order to carry out such measurements, it is advisable to utilize a plurality of pressure sensors, of known kind, which are placed in the movement track, in the rolling zone of the tires, whether load-bearing or guide tires.

The measurements performed in this way are subject to variation. In particular, depending on the state of wear of the tire, one observes a more or less pronounced degradation of the tread, in certain cases with loss of the rubber making up the tire on the movement track. This will then have, for a nominal inflation pressure PpneuN and a nominal load, different dimensions and/or different shape from what is observed with a new tire. Thus, in order to limit as much as possible the influence of the state of the tread of the tire on the measurement taken, one utilizes a plurality of pressure sensors for the measurement of the pressure on the ground Psol of a tire. A tire rolling over a plurality of pressure sensors during its movement produces, for the same tire, a plurality of measurements of the pressure Psol which it exerts on the movement track.

Figure 4:
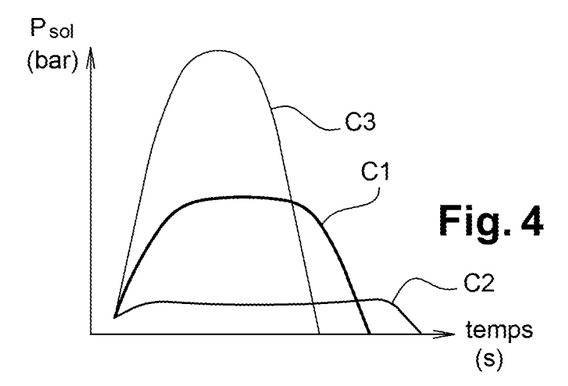
FIG. 4 is a set of three simplified curves illustrating the variation in the pressure on the ground as a function of the time, depending on the state of inflation of the tire.

Depending on whether the tire is inflated to its nominal inflation value: Ppneu=PpneuN, over-inflated: Ppneu>PpneuN or under-inflated: Ppneu<PpneuN, one will obtain different curves, as illustrated in FIG. 4.

These curves represent the variation in the pressure Psol exerted by the tread on the ground as a function of the time of movement of the tire over the pressure sensor, depending on the state of inflation of the tire. One obtains as many curves as there are sensors, for the measurements on the very same tire. Here, three curves C1, C2, C3 represent, each in simplified manner, pressures on the ground Psol for the various cases of inflation pressure of a tire, as described above. Curve C1 illustrates a pressure Psol representative of a nominal inflation pressure PpneuN. Curves C2 and C3 represent respectively an inflation pressure Ppneu less than and greater than the pressure PpneuN, i.e., in the cases of an under-inflated tire and an over-inflated tire.

One notices that the greater the pressure exerted on the ground by the tire Psol, the shorter the time of movement of the tread over the pressure sensor. Furthermore, the greater the inflation pressure Ppneu, the more the maximum pressure exerted Psol is observed during a limited time interval. In other words, the greater the inflation pressure Ppneu, the more the shape of the curve corresponding to the pressure on the ground Psol has a narrow and pointed peak.

As indicated above, a relation exists between the inflation pressure of the tire Ppneu and the pressure exerted by the latter on the ground Psol. In other words, there exists a relation, which is linear overall and has been experimentally proven, between these two pressures. It is thus possible, starting from measurements of the pressure exerted on the ground by a tire, and depending on different known inflation pressures, to establish experimentally such a relation.

Starting with curves C1 to C3 of FIG. 4, one determines the pressure exerted on the ground Psol, by taking into account various indicative values, as determined experimentally by the patent applicant. These indicative values are chosen from among three pressure values read off from the curves C1 to C3. It is either the pressure measured half-way through the total measurement time, denoted as Psolt, or the maximum pressure measured, denoted as PsolM, or the mean pressure measured, denoted as Psolm. According to the invention, it is possible to use one of these values or a combination of two or three of these values.

Thus, whether one considers Psolt and/or PsolM and/or Psolm, and postulating that these values are representative of Ppneu, the relation is determined experimentally, and this for the type of tire. Thus, for a given type of tire, i.e., for a given model and dimension of a tire, one will determine the relations, advantageously with the mentioned conversions, between the pressure exerted on the ground Psol and the inflation pressure of the tire Ppneu.

The patent applicant has discovered that these relations are applicable to a type of tire, regardless of the manufacturer of the tire. It is thus necessary to establish these relations for each type of tire used.

It will be understood that what has been presented above is applicable when one or several pressure sensors are used, i.e., during measurements taken in a series.

Even so, the patent applicant has discovered an inaccuracy and a lack of reliability of the measurements observed when the tire is not in permanent contact with the sensor or sensors, on account of dynamic movements of the vehicle, said movements being unexpected.

In particular, the patent applicant has discovered that movements of the tire in a plane perpendicular overall to the movement surface of the tire cause a degraded contact between the tire and the sensor or sensors. In other words, movements of flattening and lifting exerted by the tire on the sensor influences the quality of the measurement. These movements, which may be understood as a jumping of the tire on the movement surface, are random, both in frequency and in amplitude. They may be due, for example, to a defective suspension of the vehicle, producing an oscillatory phenomenon. They may likewise be due to a deficient planarity of the movement track in the area of the zone where the pressure sensors are situated, likewise producing an oscillatory phenomenon. The phenomenon is all the more pronounced as the shock absorption of the vehicle is defective and the zone of installation of the pressure sensors is not planar.

When oscillations occur, one distinguishes in particular two phases which affect the quality of the measurement of the pressure on the ground Psol. A first or flattening phase, which corresponds to the low portion of the oscillatory movement produces a flattening of the tire against the pressure sensor and thus, de facto, a larger than expected pressure on the ground Psol, and thus an over-evaluated inflation pressure Ppneu. A second or lifting phase corresponds to the high portion of the oscillatory movement. It generates a minimal contact, or in certain cases even a pointlike absence of contact of the tire against the pressure sensor. Hence, the pressure measured on the ground Psol is less than the expected pressure on the ground, and thus an under-evaluated inflation pressure Ppneu.

The patent applicant has likewise discovered, in a surprising manner, that two tires of the same type, inflated to the same pressure Ppneu and mounted on different axles of a same vehicle, may present two substantially different curves illustrating the variation in the pressure on the ground Psol as a function of the time. The differences observed concern the amplitude and the shape of the curves.

Furthermore, the trials carried out by the patent applicant have shown that the precision of the determination of the inflation pressure Ppneu lies in a range which may be as much as ±1.5 bar as compared to the real inflation pressure.

These various points have led the patent applicant to develop a method of measurement of the inflation pressure Ppneu which can overcome, or at least limit as much as possible, the impact of these phenomena on the precision of the measurement taken. In other words, the method which is the subject of the invention takes into account other elements, which are measured or calculated based on the movement of the tire over the pressure sensor or sensors, these elements likewise being in a relation with the inflation pressure of the tire Ppneu.

These new elements are two in number. On the one hand, there is the length Lpneu of the portion of the tire tread which is in contact with the ground during its movement over the pressure sensor or sensors, and on the other hand, the shape F of the curve illustrating the distribution of the forces exerted on the ground by the tire as a function of the time.

It is known that the surface of contact of the tire with the ground, i.e., de facto with the pressure sensor, varies as a function of the inflation pressure Ppneu, but also as a function of the load applied to the tire, and thus the number of passengers and/or the quantity of goods in the vehicle.

The patent applicant has utilized the fact that, for vehicles outfitted with the same tires, and this for the majority of types of tires used, the surface of contact of the tire with the ground, during its movement, only varies overall in the sense of the length, that is, a direction parallel to the direction of displacement of the tire during its movement, when the inflation pressure Ppneu varies.

This length Lpneu is calculated from the time when the tire is present on the pressure sensor, tpneu, and the velocity Vpneu of the tire during its movement over the sensor, according to the following relation:

$$L_{pneu} = V_{pneu} \cdot t_{pneu}$$

The time of the presence of the tire tpneu on the sensor is determined from the curve illustrating the variation in the pressure on the ground Psol as a function of the time. It is advisable to find the difference between the two time values corresponding respectively to the end and to the start of the measurement of the pressure on the ground Psol. In other words, the interval of time between the two time values where Psol is zero yields the total measurement time, i.e., the time for the presence tpneu of the tire on the pressure sensor. One will understand that, with a plurality of sensors, one obtains as many values for tpneu as there are pressure sensors involved in the measurement.

The velocity Vpneu of the tire, during its movement over the pressure sensor is, for example, measured, advantageously, from the distance between two pressure sensors which are aligned and intended to measure the pressure on the ground Psol for a same tire and from the difference, on the curve, between the two time values corresponding to the start of the measurement of the pressure on the ground for each pressure sensor.

In other embodiments of the invention, one uses the two time values corresponding to the end of the measurement of the pressure on the ground for each pressure sensor or the two time values corresponding to the start and to the end of the measurement for one or two pressure sensors. One will understand that, besides the use of two pressure sensors, the velocity Vpneu taken into account is the mean of the velocities taken into account for the different pressure sensors. Here, the means used for the measurement of the velocity makes it possible to perform the measurement with the same pressure sensors. As a variant, not illustrated, other means for measurement of the velocity of the tire are employed.

Furthermore, in order for the length Lpneu to depend only on the inflation pressure Ppneu, it is advisable to eliminate any other factor liable to cause the length Lpneu to vary, and this for a same inflation pressure Ppneu. In particular, it is advisable to eliminate the load applied to the tire.

To do so, the length Lpneu, according to the invention, is broken up into two terms. The first term corresponds to the length of contact of the tire when it is subjected to a so-called empty load, that is, when the vehicle on which the tire is mounted is itself subjected to a zero load, namely, with no passengers and/or goods. This length, denoted hereafter as Lvide, only depends on the inflation pressure of the tire Ppneu.

The second term is representative of the load applied to the tire. For this, one will weigh a load factor, denoted as FC, with a coefficient denoted as K and whose determination will be detailed later on. The load factor FC varies from a value 0 when the vehicle is empty to the value 1, when the load of the vehicle is maximal.

It will be understood that, for a tire mounted on a vehicle loaded with between 0 and 100% of the maximum load, i.e., with a load factor FC varying from 0 to 1, the length Lpneu measured by the pressure sensor is equal to the empty length Lvide plus K times the load factor FC. The relation between the length Lpneu measured by the pressure sensor and the empty length is thus:

$$Lpneu=Lvide+K \cdot FC$$

The sought value here is Lvide, since this length of contact is solely a function of the inflation pressure of the tire Ppneu:

$$Lvide=Lpneu-K \cdot FC$$

We shall define Lmin as being the length of contact of the tire as measured by the pressure sensor when, for a tire inflated at the nominal inflation pressure PpneuN, the load which is applied to it is minimal, that is, when the vehicle is empty. In this case, FC=0 and Lpneu=Lmin, so that:

$$Lvide=Lmin.$$

Likewise, we shall define Lmax as being the length of contact of the tire as measured by the pressure sensor when, for a tire inflated at the nominal inflation pressure PpneuN, the load of the vehicle is maximum. In this case, FC=1 and Lpneu=Lmax, so that:

$$Lvide=Lmax-K \cdot 1$$

In the two relations indicated above, the empty lengths Lvide are identical, since they are defined for a tire inflated to the nominal inflation pressure, PpneuN. Thus, the value of the coefficient K is equal to the difference between the two lengths: K=Lmax−Lmini.

As mentioned above, the load factor varies between 0 and 1, depending on the load of the vehicle. In order to determine the load factor FC between these two extremes, one relies on the following hypotheses:

The load of the vehicle is distributed uniformly over all the tires of the vehicle.

The mean of the pressures of the tires of the vehicle is very close to the nominal inflation pressure of a tire. Therefore, the mean of the lengths of the tires of the vehicle corresponds to the length of a tire at nominal pressure with the load applied.

By applying these hypotheses to the initial relation between the measured length Lpneu and the length Lvide at the nominal inflation pressure and at the minimum load, or:

Lmoyen=Lvide+K·FC, with Lmoyen being the mean length of contact measured for the set of tires of the vehicle, with K=Lmax−Lmin and Lvide=Lmin, one obtains:

$$FC=(Lmoyen-Lmin)/(Lmax-Lmin)$$

Since Lvide=Lpneu−K·FC, we deduce from this:

$$Lvide=Lpneu-(Lmax-Lmin) \cdot (Lmoyen-Lmin)/(Lmax-Lmin)$$

Such a relation is simplified to become:

$$Lvide=Lpneu-(Lmoyen-Lmin)$$

It should be noted that when all the tires of the vehicle are inflated to the nominal inflation pressure PpneuN, then Lpneu=Lmoyen and the relation Lvide=Lmin is verified.

It should be noted that, in this relation, Lpneu is a measurement obtained during the movement of the tire over the pressure sensor, Lmoyen is a value calculated from values Lpneu measured for all the tires of a same vehicle, and Lmin is a value experimentally defined for a type of tire and vehicle by measuring the length of contact Lpneu for a nominal inflation pressure PpneuN and a load of the vehicle FC=0, or an empty vehicle.

We have thus determined a characteristic Lvide which depends only on the inflation pressure Ppneu.

Since the length of contact of the tire at zero load, or Lvide, is solely a function of the inflation pressure of the tire Ppneu, the inverse relation exists: Ppneu=$f$(Lvide).

It will be understood that the functions $f$ are multiple functions: a given function $f$ may be specific to a tire or a vehicle or common to several tires of this same vehicle. These functions are established by experimentation, measuring the lengths of contact Lpneu of tires whose inflation pressures Ppneu are known.

Figure 5:
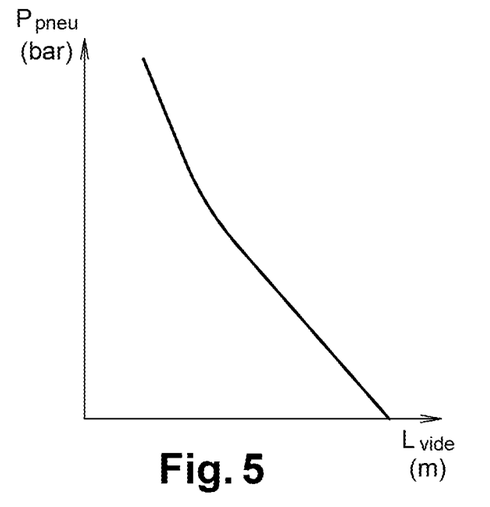
FIGS. 5 and 6 are schematic curves illustrating respectively the variation in the inflation pressure depending on the length of the tread of the tire in contact with the ground and depending on the shape of the curve.

FIG. 5 thus illustrates the relation between the inflation pressure of a tire Ppneu as a function of the length of contact Lpneu determined by experimentation. In the present case, the characteristics of the tire having been used to plot the curve are as follows: standardized dimensions of the tire, according to the current nomenclature in Europe: 315/95R16, with 315 being the width of the tire in millimeters, 95 the height of the sidewall in relation to the width expressed as a percent, R the internal construction of the tire, here radial, and 16 the inner diameter of the tire in inches. The curve has been plotted for different inflation pressures.

It will be noted that the length of movement of the tire over a given pressure sensor or sensors is greater as the inflation pressure of the tire is less.

As previously mentioned and illustrated in FIG. 4, one notices that the shapes of the curves of the tire pressure on the ground Psol as a function of the time, depending on the state of inflation of the tire as compared to the nominal inflation pressure PneuN, are very different and are characteristic of the state of inflation of the tire. The curves, regardless of their amplitudes and lengths, are more flattened out in the area of their respective peaks as the inflation pressure Pneu is less.

Thus, as compared to the curve C1 corresponding to a nominal inflation pressure, the same over-inflated tire shows a curve C3 more bulging at the peak, while the same under-inflated tire produces a curve C2 flattened out at the peak to form a cavity. In other words, curve C2 corresponding to an under-inflated tire shows a peak configured in negative relief as compared to curve C1 corresponding to the nominal inflation pressure. On the other hand, an over-inflated tire generates a curve C3 with a peak in positive relief as compared to the peak of the curve corresponding to the nominal inflation pressure.

Based on these findings, the patent applicant decided to take account of the shape of the curves as being a characteristic of the inflation pressure Ppneu. To do so, the patent applicant developed a numerical characterization of the shape of the curve. The numerical characterization used has proven to be one which provides the best representation of the shape of the curve, given that other relations exist. As non-limiting examples, one may mention taking into account the ratio between the maximum pressure and the mean pressure or the mean slope at the start of the curve.

The relation developed and validated by the patent applicant consists in quantifying the shape of the curve, denoted as Forme, by the ratio between the value of the pressure exerted on the ground, taken at the center of the curve, i.e., the pressure found midway in time, denoted as Psolt, and the mean pressure exerted on the ground Psolm.

$$Forme = Psolt/Psolm$$

Inasmuch as we have found that the shape of the curve is a direct function of the inflation pressure of the tire Ppneu, it will be understood that the reciprocal is likewise true: the inflation pressure Ppneu is a direct function of the shape of the curve:

$$Ppneu = f(Forme)$$

The patent applicant has found that the functional relations or the functions $f$ are applicable, not only to a type of tire, but also to a given axle on the same vehicle. In order to define such functions by experimentation, the patent applicant took measurements of the shape, starting with curves illustrating the pressure exerted on the ground Psol as a function of the time with tires whose inflation pressure is known. As before, these different functions f shall be used to develop fuzzy models allowing a determination of the inflation pressure of the tire Ppneu as a function of at least two parameters, chosen among the pressure on the ground Psol, the length of the empty tread Lvide or the shape of the curve, denoted as Forme.

Figure 6:
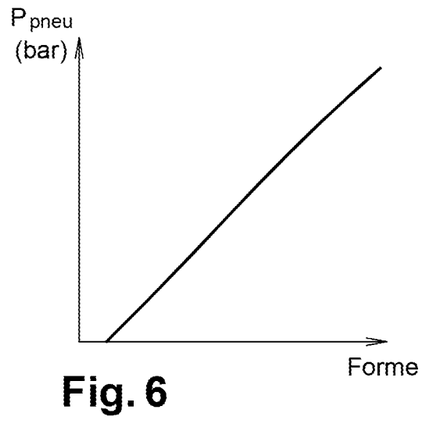

FIG. 6 thus illustrates the variation in the inflation pressure Ppneu according to the shape of the curve, for the following measurement conditions: subway tire of standardized dimensions 315/95R16 inflated to pressures varying between 6 bar and 13 bar. It should be noted that the shape has no dimensional unit, since it is calculated from a ratio of pressures.

By taking into account, for a given pressure sensor, not only the pressure exerted on the ground Psol by the tire but also elements obtained by calculation, namely, the length of movement of the tire Lvide and the shape of the curve Forme, the patent applicant has three elements, each being dependent on the sought characteristic, namely, the inflation pressure of the tire Ppneu.

The patent applicant has chosen to implement the invention by a fuzzy computer to determine Ppneu from at least two of the three variables Psol, Lvide, Forme. One of the benefits of using fuzzy logic is that it allows the modeling of imperfections of the measured data and especially it allows the applying of different rules according to the types of tires used and their positions on the vehicle. Another benefit of fuzzy logic is the possibility of easily integrating other parameters into the calculation of the pressure, such as the ambient temperature, the ambient humidity, or the temperature of the tire. By ambient temperature and humidity is meant the temperature and the humidity detected in the area of the pressure sensors.

In order to implement the fuzzy logic, it is advisable to characterize the fuzzy subsets of each of the input variables Psol, Lvide and Forme. To do this, one uses recordings of measurements taken with vehicles outfitted with tires inflated to defined pressures. One thus has measurements for under-inflated, nominally inflated, and over-inflated tires, the measurements being sufficient in number to cover the different conditions of inflation of the tires.

Figure 7:
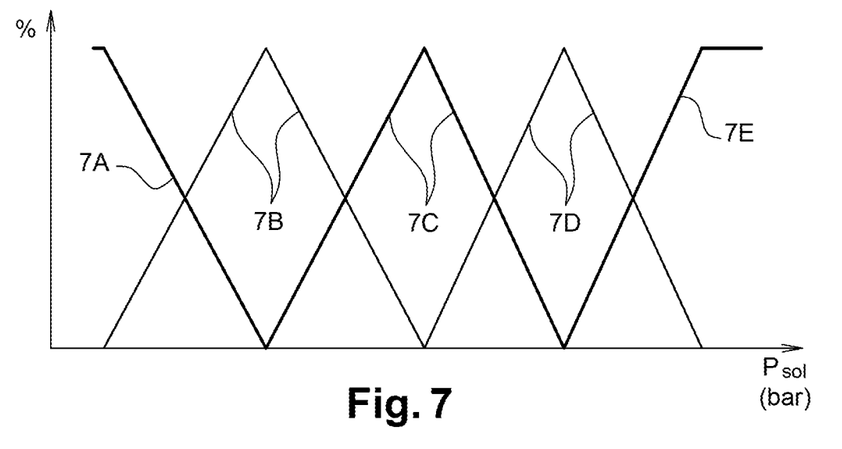
FIG. 7 illustrates the functions of belonging to the fuzzy subsets defined for one of the quantities, here, the pressure on the ground Psol.

To simplify the settings, as a non-limiting example, it is advantageous to limit the number of fuzzy subsets to five for each of the three input variables Psol, Lvide and Forme. The subsets used here are: very deflated 7A, deflated 7B, nominal 7C, over-inflated 7D and very over-inflated 7E.

By using the measurements gathered and by applying the definition of the fuzzy sets, one obtains the functions belonging to the fuzzy subsets as defined for each input variable. FIG. 7 illustrates the functions obtained belonging to the variable Psol. Here, the ordinate axis has no dimensional unit. It corresponds to a degree of belonging to each subset, of between 0% and 100%. For example, when Psol is close to zero, curve 7A is close to 100%, whereas the other curves are close to zero. Another example: when one considers Psol at the intersection of the curves 7B and 7C, Psol is close to 50% for these curves, the other curves being close to zero.

The fuzzy subsets thus obtained define the characteristics of the input data of a fuzzy model to which it is necessary to add fuzzy rules. One may mention here, as an example, the following rule: if Psol is nominal, Lvide and Forme likewise being nominal, then the pressure of the tire Ppneu is nominal.

In the course of the application of the invention for a tire-mounted subway, the patent applicant has made various findings in regard to the input variables Psol, Lvide, Forme.

The input variable Psol has an elevated level of replicability, but it is falsified during dynamic vertical movements of the vehicle, and thus during phases of lifting or flattening of the tires, which such are present.

The input variable Lvide has a less elevated level of replicability than Psol. It is highly dependent on the phases of lifting or flattening of the tires and makes it possible to compensate for errors in Psol.

The input variable Forme is very reliable since it has the most elevated level of replicability. It is thus hardly subject to variations, even in the phases of lifting or flattening of the tires.

The behavior of the input variables Psol, Lvide and Forme, depending on the various subsets, is presented in table 1 below. Here, the terms "normal" and "nominal" are synonymous.

TABLE 1

| Measurement instance | Psol | Lvide | Shape |
| --- | --- | --- | --- |
| 1 - Ppneu nominal | normal | normal | normal |
| 2 - Ppneu very deflated | Very deflated | Very deflated | Very deflated |
| 3 - Ppneu deflated | Deflated | Deflated | Deflated |
| 4 - Ppneu over-inflated | Over-inflated | Over-inflated | Over-inflated |

TABLE 1-continued

| Measurement instance | Psol | Lvide | Shape |
|---|---|---|---|
| 5 - Ppneu very over-inflated | Very over-inflated | Very over-inflated | Very over-inflated |
| 6 - Ppneu nominal in lifting phase | Deflated | Over-inflated | Normal |
| 7 - Ppneu nominal in flattening phase | Over-inflated | Deflated | Normal |
| 8 - Ppneu nominal in strong lifting phase | Very deflated | Very over-inflated | Normal |
| 9 - Ppneu nominal in strong flattening phase | Very over-inflated | Very deflated | Normal |

In the case of the measurements referenced as 6 to 9, the variables Psol and Lvide cancel each other out and, by adding the stability of the variable Forme, the output variable of the fuzzy computer Ppneu is no longer under-evaluated (the case of measurements 6 and 8) or over-evaluated (the case of measurements 7 and 9).

The approach to the determination of the fuzzy rules can be split up into two parts. The first part consists in identifying rules based on the intrinsic behavior of the tires. These rules make it possible to obtain an output value Ppneu as determined by the fuzzy computer, which is satisfactory in the majority of cases.

The second part consists in determining fuzzy rules for the particular cases of the measurements (lifting and flattening of the tire, for example). This second set of fuzzy rules ensures the stability and robustness of the output value Ppneu of the fuzzy computer.

By taking into account not only the pressure exerted on the ground Psol but also the input variables Lvide and Forme calculated from measurements on the pressure sensor or sensors, and using them in a fuzzy computer, the patent applicant has developed a measurement method whose precision and reliability are enhanced, while eliminating the random nature of the measurement due to the oscillatory movements of the tire during its movement over the pressure sensor or sensors.

As a non-limiting example, the invention was implemented to evaluate the pressure of a tire whose real inflation pressure Ppneu is 7.5 bar:

In this example, the measurement of the pressure on the ground is: Psol=5.09 bar and, after conversion, the calculation of Ppneu is at 6.26 bar. The pressure of this tire is under-evaluated. Such an under-evaluation corresponds to the case of a tire in the lifting phase, i.e., when the tire is not de facto in optimal contact with the pressure sensor. For this same tire, the invention provides, in addition to Psol, values for the shape of the curve Forme of 1.12 and for the length of the tread Lvide of 0.180 m.

These values, after conversion, correspond respectively to 7.18 bar and 10.29 bar. By combining with the help of the fuzzy computer the three quantities Psol, Forme and Lvide, the invention indicates an inflation pressure Ppneu of 7.51 bar.

The improvement in the determination of the inflation pressure is significant since the difference as compared to the real pressure changes from 16% to 0.13%. Thanks to the invention, one obtains a reliable value, representative of the real inflation pressure, and eliminating the random nature of the measurement.

In another example, still for a tire whose real inflation pressure is 7.5 bar, the measurement of Psol is 9.09 bar and, after conversion, the calculation of Ppneu is 11.72 bar. The pressure of this tire is thus over-evaluated, corresponding to a measurement taken on a tire in the flattening phase, the bearing of the tire against the pressure sensor being maximal, and the tire falling back onto the pressure sensor after a lifting phase.

For this same tire, the invention shows values for the shape of the curve Forme of 1.16 and for the length of movement Lvide a value of 0.231 m. After conversion, this corresponds respectively to 8.12 bar and 3.19 bar. By combining the obtained values Psol, Forme and Lvide, the invention calculates an inflation pressure Ppneu of 8.08 bar. The improvement in the measurement is also significant here, since one goes from a difference of 56% to a difference of 7.7%.

The patent applicant has performed a simulation based on 2320 measurements of the inflation pressure of tires. The patent applicant found that the invention makes it possible to divide by 3.5 the rate of measurements outside the interval [PpneuRéelle−1.5 bar; PpneuRéelle+1.5 bar]. Thus, the invention makes it possible to obtain a value quite representative of the inflation pressure of a tire, without modifying the means of measurement, namely, the pressure sensors, and eliminating the principal parameters affecting such a measurement during the movement of the vehicle.

The invention claimed is:

1. Method of measuring the inflation pressure of the tires (Ppneu) outfitting a vehicle in movement, comprising at least the following steps, during which:
   a) one measures the pressure exerted on at least one sensor of pressure (1) secured to the ground, in the rolling zone of the tire, by a tire (3, 3',3",3'") rolling over said sensor (1),
   b) one measures the time (t) during which the tire (3, 3',3",3'") rolls over said sensor (1), the latter representing a known surface of contact,
   c) one establishes, during the movement of the tire (3, 3',3",3'") over said sensor (1), a curve (C1, C2, C3) representing the distribution of the forces (Psol) exerted by the tire (3, 3',3",3'") on said surface of contact as a function of the time (t),
   d) one determines the inflation pressure (Ppneu) of the tire (3, 3',3",3'") with the aid of a computer, with a programming chosen from among an algorithmic programming or a fuzzy logic, integrating at least one model established from measurements taken during steps a) to c) on tires (3, 3',3",3'") whose inflation pressure is known, characterized in that the method comprises at least the following step:
   e) during step d), the model used takes into account two other parameters, namely, the length (Lpneu) of the tire (3, 3',3",3'") tread in contact with said sensor (1), determined during the measurement performed in step b), the speed of the tire being known, and the shape (Forme) of the curve (C1, C2, C3) obtained in step c).

2. Method according to claim 1, characterized in that, during a supplemental step f), prior to step d), the length (Lpneu) of the tread of the tire (3, 3',3",3'") in contact with said sensor (1) during the measurement performed in step a) is established according to a relation (Lvide=Lpneu−K.FC) taking into account the load applied to said tire, Lvide being the length of contact of the tire with the ground when it is subjected to a so-called empty load, K being a coefficient corresponding to the difference between the lengths of the tread under maximum load (Lmax) and empty load (Lvide) and FC being a load factor varying from 0 to 1 depending on whether the vehicle is at empty or at maximum load.

3. Method according to claim 1, characterized in that during a supplemental step g) prior to step d), the shape (Forme) of the curve (C1, C2, C3) is quantified by a relation taking into account the pressure exerted midway (Psolt) through the movement of the tire (3) over the sensor (1) and the mean pressure (Psolm) exerted by the tire (3) during its movement over the sensor (1).

4. Method according to claim 1, characterized in that steps a) to c) are performed with several pressure sensors (1) and in that each of the values obtained per sensor is used for steps d) and e).

5. Method according to claim 2, characterized in that steps a) to c) are performed with several pressure sensors (1) and in that each of the values obtained per sensor is used for steps d) and e).

6. Method according to claim 3, characterized in that steps a) to c) are performed with several pressure sensors (1) and in that each of the values obtained per sensor is used for steps d) and e).

* * * * *